No. 644,598. Patented Mar. 6, 1900.
C. O. HEGGEM.
MOTOR VEHICLE.
(Application filed Apr. 17, 1899.)
(No Model.) 2 Sheets—Sheet 1.

No. 644,598. Patented Mar. 6, 1900.
C. O. HEGGEM.
MOTOR VEHICLE.
(Application filed Apr. 17, 1899.)
(No Model.) 2 Sheets—Sheet 2.
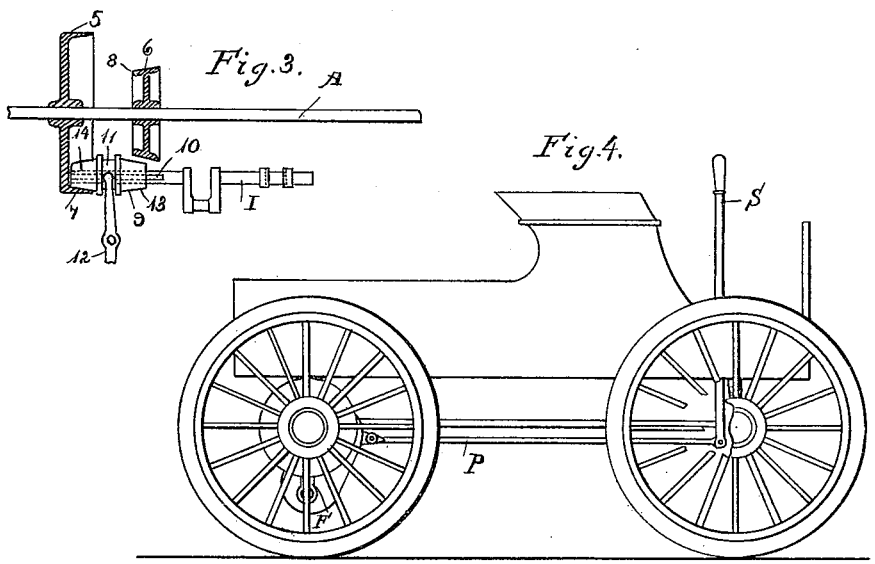
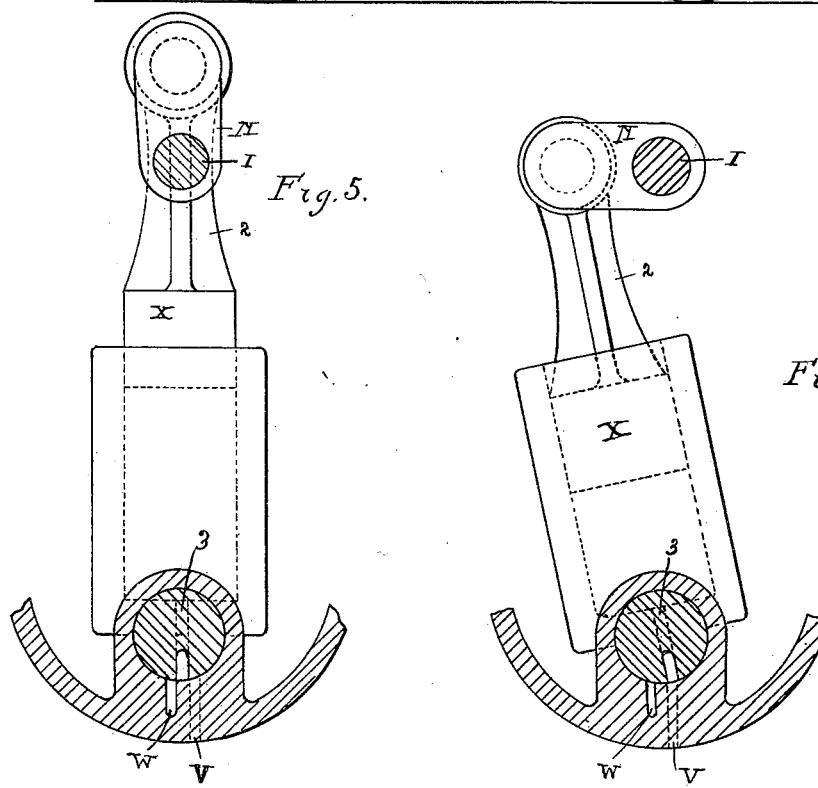
Witnesses
Inventor
Charles O. Heggem,
By his Attorney

UNITED STATES PATENT OFFICE.

CHARLES O. HEGGEM, OF MASSILLON, OHIO.

MOTOR-VEHICLE.

SPECIFICATION forming part of Letters Patent No. 644,598, dated March 6, 1900.

Application filed April 17, 1899. Serial No. 713,248. (No model.)

*To all whom it may concern:*

Be it known that I, CHARLES O. HEGGEM, a citizen of the United States, residing at Massillon, in the county of Stark and State of Ohio, have invented certain new and useful Improvements in Motors for Vehicles, of which the following is a specification, reference being had therein to the accompanying drawings.

This invention relates to certain new and useful improvements in fluid-pressure motors for vehicles.

The objects of this invention are, first, to provide one or more oscillating single-acting engines adapted to be operated by compressed air, steam, gas, or other suitable pressure fluid without employing valves and eccentrics, such fluid being admitted through a passage in one of the engine-trunnions and exhausted through another trunnion, such engine also being adapted to oscillate to close the inlet-passage at the proper time and open the outlet-passage, and vice versa.

My invention also relates to suitable means for transferring the power from said oscillating engines to a suitable vehicle, such power being so applied to said vehicle that it may run either backward or forward, as desired.

My invention also relates to an improved means for oiling the engine-pistons and bearings for the trunnions for said engines.

My invention also relates to details of construction and arrangement hereinafter appearing, and particularly pointed out in the claims.

Figure 1:
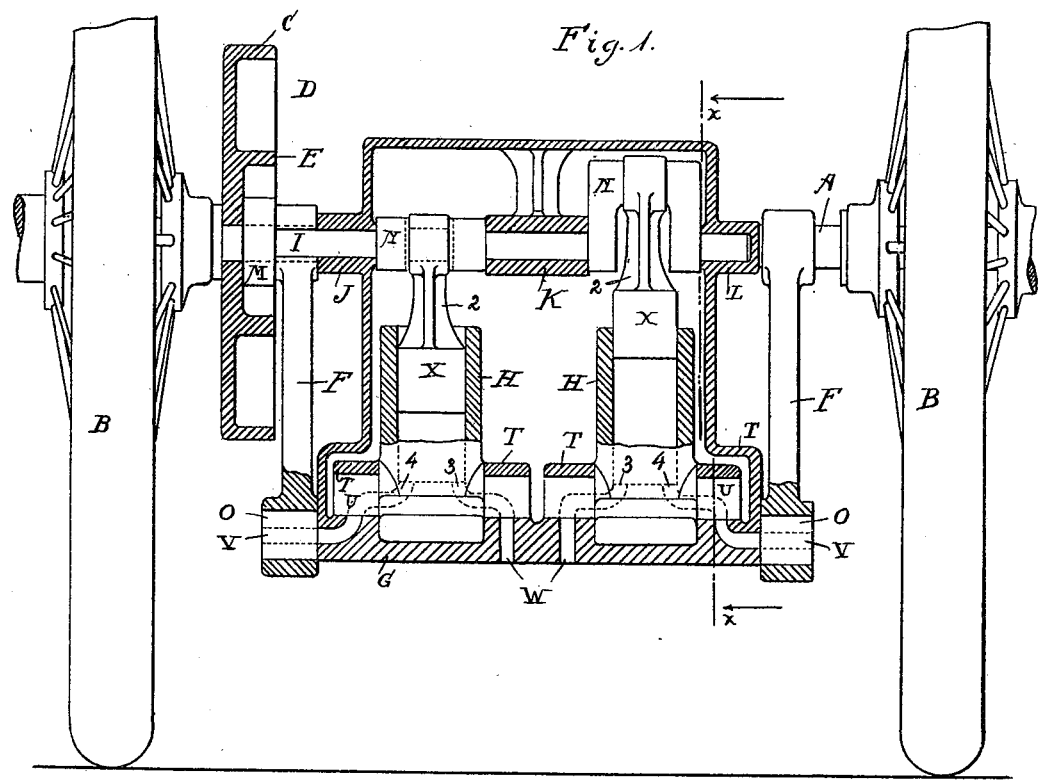
Figure 2:
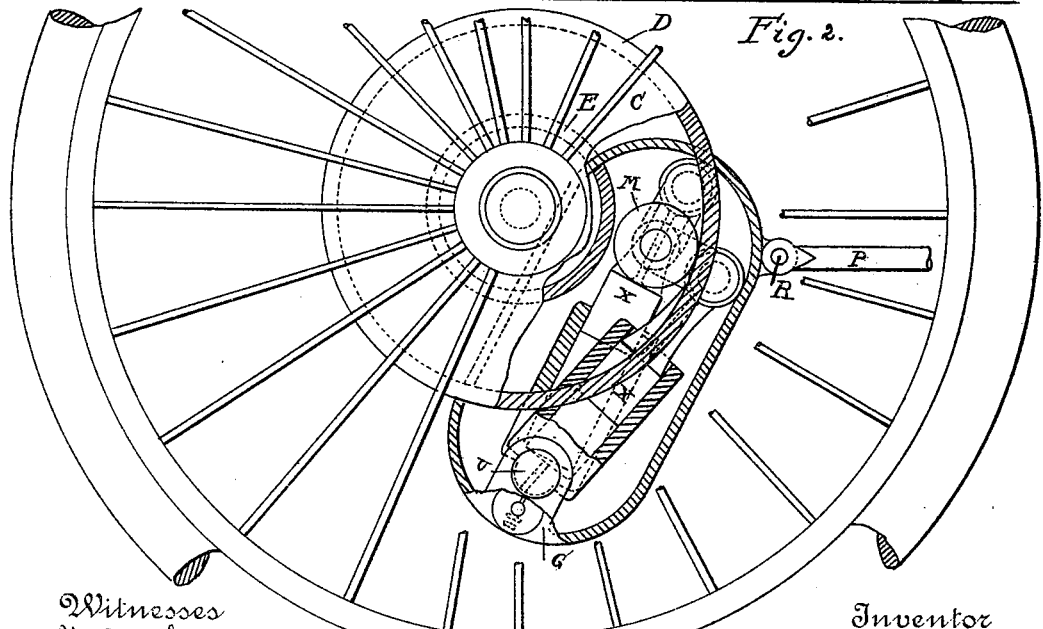

In the accompanying drawings, on which like reference characters indicate corresponding parts, Figure 1 is a longitudinal sectional view of my invention, showing one form of frictional clutch secured upon a vehicle-axle or driving-shaft; Fig. 2, an end elevation, partly broken away, of what is shown in Fig. 1, parts being also in section; Fig. 3, a detail view showing a different form of clutch; Fig. 4, a side elevation of a vehicle with my invention applied thereto; Fig. 5, a sectional view on the line $x$ $x$ of Fig. 1, looking in the direction of the arrows and showing one of the engine-cylinders in such a position that the inlet and exhaust ports are cut off; and Fig. 6, a similar view to Fig. 5, showing the inlet-port in communication with one of the cylinders.

The letter A represents one axle of a vehicle to which my invention may be applied. Upon this axle is mounted a pair of wheels in any suitable manner. One member of a friction-clutch C is also mounted upon this shaft or axle. This friction-clutch carries an outer and an inner flange, such as shown at D and E, respectively, such flanges being adapted to be engaged by the other clutch member in a manner presently to appear, whereby when the interior of the outer flange D is engaged the axle will be driven in one direction and when the exterior of the inner flange E is engaged the axle will be driven in the opposite direction. A pair of pivoted arms F are supported at one end by the axle A and carry at their other end a swinging housing G, such housing carrying one or more single engines H and also the shaft I, the latter being mounted in bearings J, K, and L, respectively.

Upon referring to the shaft I particularly it will be seen that it carries a roller M and also cranks N. The roller M is adapted to swing into engagement with either of the outer or inner flanges of the clutch member in a manner presently to appear. As above stated, the housing G is mounted upon the arms F, so that it, together with the crank-shaft I, may be freely swung from bearings O in the lower ends of said arms. This is accomplished by means of a pitman P, pivotally connected to the housing G, as shown at R. The other end of this pitman engages with a hand-lever S, as shown in Fig. 4. As this hand-lever is operated the pitman is reciprocated back and forth, and consequently the housing G is moved backward and forward, thus causing the clutch-wheel M to bind against the flange E and against the flange D, according to the direction in which the lever is thrown. In this manner the vehicle is made to run backward or forward, as desired, but with different speeds, as the friction-clutch flanges D and E are different in size.

I will now refer to the manner in which the shaft I, which I will term the "crank-shaft," is operated. It will be seen that to each of the cylinders H is secured a pair of hollow trunnions T on opposite sides of the cylinder, these trunnions having a bearing in the housing, as shown at U, such bearings being preferably bored out, as particularly seen in Fig. 2. Inlet and outlet passages W and V, respectively, extend through the casing into these bearings and into other ports 3 and 4 in the trunnions and cylinders, the passages W acting to convey the expansive medium into the engine-cylinder, while the passages V act to convey such medium from the cylinders after it has been used therein to operate the pistons, which I will now describe. In each of these cylinders is mounted a suitable piston X, which is connected with a crank N formed in the crank-shaft I. Let us now suppose that one of these pistons is at its innermost position. While in such position the operating medium enters the inlet-port W and passes through the passage 3 in one of the trunnions T into the engine-cylinder beneath said piston. This will cause the piston to immediately make its outstroke, so that the crank-shaft will be rotated. By reason of this rotation the cylinder is rocked on its trunnions T, and the inlet-passage 3 in one of said trunnions is cut off, so that the operating fluid may expand to give up the larger portion of its energy. As the crank-shaft is still further rotated the cylinder will be rocked to such a position that an exhaust-port 4, extending through the other of said trunnions T, will match with the exhaust-port V, so that the pressure fluid may be exhausted before the cylinder takes in another charge. Thus it will be seen that the trunnions of the cylinder itself cut off the inlet-port and open the exhaust-port, and vice versa. The times of cutting off these ports are properly related, so as to derive the best results from the pressure fluid. Thus with my arrangement I am enabled to do away with valves, eccentrics, &c., commonly employed in engines, so that I have very much simplified the engine construction, whereby it is less liable to get out of order and is much more cheaply constructed. As shown in the drawings, the cranks are preferably formed at an angle to each other, so that they will operate at different times to drive the crank-shaft, and thereby the vehicle.

Referring now to the modified form of clutch construction, it will be seen from Fig. 3 that upon the shaft A or axle-shaft I have mounted two flanged wheels 5 and 6, one of which is smaller than the other and is a short distance from the other. The interior of the flanged wheel 5 is beveled outward, as shown at 7, while the exterior of the wheel 6 is beveled toward the wheel 5, as shown at 8. A double-tapered roll 9 is slidingly mounted upon the crank-shaft I and is held from rotating independently of the crank-shaft by means of a spline 10. About midway between the ends of this tapered roll is formed an annular groove 11, within which fits one end of the pivoted lever 12, supported in any suitable manner. This lever is adapted to throw the double-tapered roll, which constitutes the second member of the clutch, either into engagement with the interior of the wheel 5 or into engagement with the exterior of the wheel 6. When this roll is in engagement with the wheel 5, the vehicle is driven in one direction, and while in engagement with the wheel 6 it is driven in the opposite direction, but with the same speed, as the end of the roll 13 is smaller than the end 14 and the clutch-wheels are properly proportioned to give this result. When this form of clutch is used, it will be understood that the housing G may remain stationary.

In the drawings I have illustrated two simple engines connected with the crank-shaft; but I wish to be understood as not limiting myself to any particular number, as in some instances, where very heavy loads are to be hauled and where the vehicle is to be used in hilly countries, I may employ three or more of such engines, so that there will be no possibility of the vehicle stopping by reason of the crank getting over the dead-center, as such cranks may be so located with respect to each other that this can never occur. It will also be understood that I do not wish to confine myself to any particular medium for driving these engines, as they may be driven by steam, compressed air, or gas, as desired. In the drawings I have shown no means of conducting such fluid to the inlet-ports; but this, being outside of my invention and being accomplished in any desired manner, has been omitted to simplify the drawings. The housing forms an air-tight compartment, so that it may partly be filled with oil in order that the trunnions and pistons may be thoroughly oiled. From the above description it will also be understood that the crank-shaft always travels in the same direction, the vehicle being driven forward or backward through my improved friction device. In some instances, however, spur-gearing may be employed in the place of the friction-gear; but I prefer the friction-gear for ordinary purposes.

Having thus fully described my invention, what I claim as new, and desire to secure by Letters Patent, is—

1. In a fluid-pressure motor for vehicles, the combination with a main driving shaft or axle, a pair of arms pivotally mounted thereon, a motor-housing carried by said arms, one or more motors pivotally mounted in said casing, an inlet and an exhaust port extending through said casing and communicating with said cylinders, a crank-shaft mounted in bearings in said housing, pistons adapted to reciprocate in said cylinders, connected with said crank-shaft, a clutch member carried by said main driving shaft or axle, and another clutch member carried by said crank-shaft, means for swinging said housing to cause said latter clutch member to engage with the former clutch member, substantially as shown and described.

2. In a fluid-pressure motor for vehicles, the combination with a main driving shaft or axle, of a pair of arms connected therewith, a housing connected with said arms, one or more motor-cylinders within said housing, a trunnion extending from each side of each cylinder, suitable bearings for said trunnions, inlet and outlet ports opening into said bearings, a passage in each of said trunnions, said passage adapted to communicate with the respective inlet and outlet ports, a crank-shaft carried by said housing, pistons adapted to operate in said cylinders and connected with said crank-shaft whereby said cylinders are oscillated, such oscillation opening and closing said inlet and exhaust ports alternately, mechanism for connecting said crank-shaft with the vehicle driving-shaft and adapted to be manipulated in either direction, substantially as shown and described.

3. In a fluid-pressure motor for vehicles, the combination with a vehicle proper, and a tight housing supported by said vehicle, one or more cylinders having a pair of trunnions extending from opposite sides of each of said cylinders, bearings in which said trunnions are mounted, a crank-shaft mounted in said housing, a piston for each cylinder, a crank-rod for each piston, and adapted to connect with said crank-shaft whereby the pistons are oscillated, such oscillation of the pistons by the crank-shaft also acting to oscillate the cylinders, said casing and said trunnions having passages therein, said passages being opened and closed alternately by the oscillation of said cylinders, to permit a pressure fluid to enter the cylinders at one time and to escape therefrom at another time, means between said crank-shaft and driving shaft or axle for transmitting motion to said driving-shaft in both directions, substantially as shown and described.

4. In a fluid-pressure motor for vehicles, the combination with a vehicle and a structure suspended from its driving-axle, of a crank-shaft mounted in the suspended structure, clutch mechanism adapted to connect and disconnect the crank-shaft from the driving-shaft and to transmit forward-and-backward motion to the driving-shaft from a constant motion in the crank-shaft, one or more engines oscillatingly mounted in said suspended structure having their pistons connected with said crank-shaft, and having inlet and exhaust ports in said suspended structure and in the oscillating supports, and means to manipulate said clutch mechanism.

5. In a fluid-pressure motor for vehicles, the combination with a vehicle, of a structure suspended from its driving-axle, of a crank-shaft mounted in said structure, a motion-transmitting clutch device between the crank-shaft and driving-shaft and a double member on the crank-shaft, and means to swing the suspended structure to present the latter member of the clutch into contact with either surface of the former member, one or more oscillating engines mounted in said structure with the piston or pistons thereof connected to the crank-shaft and with their inlet and exhaust ports in the structure and in the oscillating supports in the cylinder or cylinders.

6. In a fluid-pressure motor for vehicles, the combination with a vehicle and a structure suspended therefrom, of a crank-shaft mounted in the suspended structure, clutch mechanism adapted to connect and disconnect the crank-shaft from the driving-shaft of the vehicle, and to transmit forward-and-backward motion to the driving-shaft from the constant motion in the crank-shaft, one or more engines oscillatingly mounted in said suspended structure having their pistons connected with said crank-shaft, and having inlet and exhaust ports in said suspended structure and in the oscillating supports, and means to manipulate said clutch mechanism.

In testimony whereof I affix my signature in presence of two witnesses.

CHARLES O. HEGGEM.

Witnesses:
JAMES PEACOCK,
JESSE J. PITTS.